Dec. 5, 1961 W. A. KUCK 3,011,345
VISUAL LUBRICANT GAUGE
Filed Nov. 3, 1958
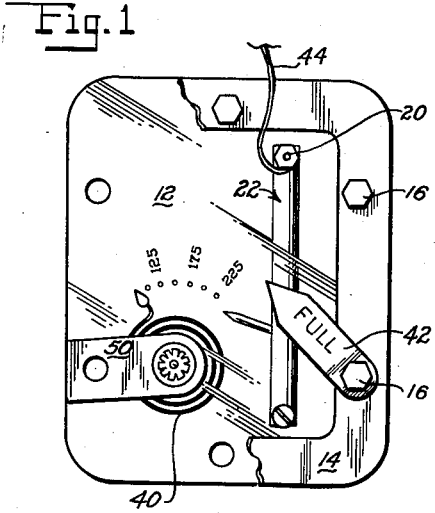
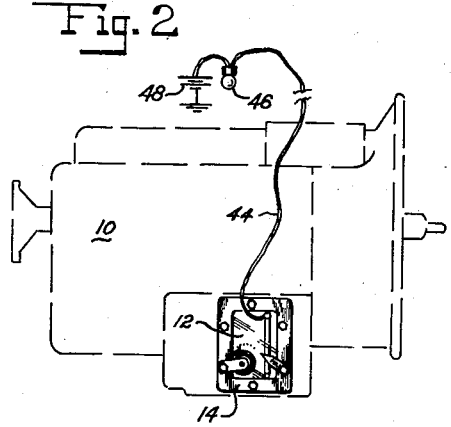
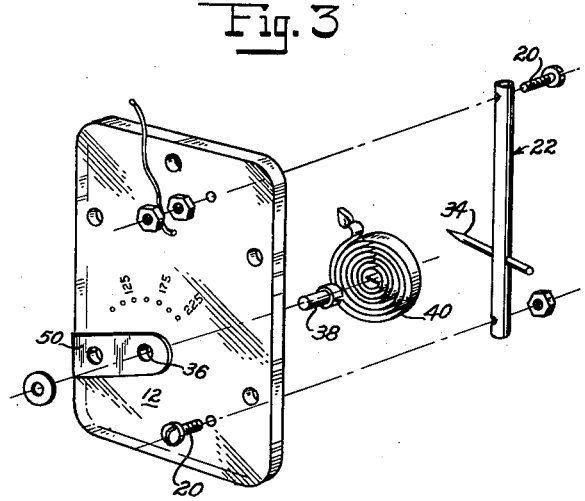
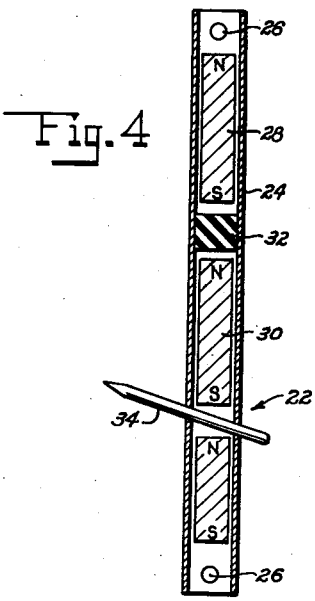
INVENTOR.
Wilbert A. Kuck
BY C. W. Coffee
Atty.

United States Patent Office 3,011,345
Patented Dec. 5, 1961

3,011,345
VISUAL LUBRICANT GAUGE
Wilbert A. Kuck, 1410 N. Belmont, Odessa, Tex.
Filed Nov. 3, 1958, Ser. No. 771,348
3 Claims. (Cl. 73—292)

This invention pertains to lubricants for truck transmissions and more particularly to a gauge for determining the level, temperature, and condition of those lubricants.

With heavy trucks there is a problem concerning the transmission. Often trouble develops in these transmissions which could inexpensively be corrected if discovered in time. However, the general lack of gauges on this area prevents the trouble from being discovered in time with the result that serious difficulties develop before the discovery of trouble. For example, if a bearing wears so that the gears are slightly out of line, this causes excessive wear. This difficulty may be determined by presence of iron filings in the lubricating oil or by over heating. If the trouble is discovered in time, the bearing may be replaced without serious wear on the gears. However, if it is not discovered soon it may be necessary to completely overhaul the transmission and replace many of the gears because it was not known that trouble had developed.

I have invented a simple gauge unit which will determine the level of the oil in the transmission, the temperature of the oil in the transmission, and presence of iron filings. One of the principal advantages of this gauge is that it is made to fit upon the power take-off opening of the transmission. The size of these power take-off openings are standardized so that one gauge is adapted to fit all makes and models of heavy trucks.

An object of this invention is to provide a gauge for determining the temperature, level, and presence of iron filings in the lubricating oil of truck transmissions.

Another object of this invention is to provide such a gauge which is adapted to fit all truck transmissions regardless of make or model.

Another object of this invention is to provide a transparent inspection plate so that the gears may be visually inspected.

Another object of this invention is to provide a magnet in the transmission housing to collect iron filings and therefore keep the transmission lubricant free of this foreign material.

Another object of this invention is to provide such a device in a single unitary piece of equipment which may be attached to any existing transmission unit.

A further object of this invention is to provide an indicator to give warning to the truck driver at his operating position in case of extreme conditions in the transmission housing.

Still further objects are to achieve the above with a device that is sturdy, compact, simple, and reliable, yet inexpensive and easy to manufacture.

The specific nature of the invention as well as other objects, uses, and advantages thereof will clearly appear from the following description and from the accompanying drawings, in which:

FIGURE 1 is an elevational view partially broken away illustrating a gauge according to this invention.

FIGURE 2 is an illustration of the gauge in place upon a transmission which is shown in phantom.

FIGURE 3 is an exploded perspective view of the gauge showing its construction.

FIGURE 4 is a sectional view of the magnet assembly.

As seen in the accompanying drawings one embodiment of this invention is built as a single unitary item.

The unit is made to fit upon the standard power take off opening found in transmission 10. It includes a transparent plate 12 of glass or suitable plastic. Plastics which are strong and not deteriorated by oil are well-known to the art and therefore are not more fully described here. The transparent plate has six holes drilled around the periphery thereof to fit the standard drillings of the power take off opening. It is held against the opening in fluid tight relationship by a gasket (not shown) and a metal ring 14 through which are six studs 16. The plate is used in lieu of the regular cover.

The plate has two additional holes through it. By means of bolts 20 a magnet assembly is attached to the inside of the plate. The magnet assembly includes tube 22 of copper or other non-magnetic materials. The tube has radial holes 26 through the extreme ends for the passage of bolts 20. The bolts also are made of non-magnetic material. Three magnets are aligned within the tube with the north end of each pointing the same direction, however, they are separated by non-magnetic material. The upper magnet 28 is separated from the middle magnet 30 by a block of rubber 32. The middle magnet is separated from the lower magnet by the shank of stop member 34. The stop member is also of non-magnetic material, and is brazed or otherwise permanently attached to the tube.

There is also hole 36 through the plate through which is riveted bolt 38. The bolt has a bifurcated end, thereby supporting a spiral thermometer element 40. Such thermometers are well known to the art and are not further described here. The pointer of the thermometer cooperates with indicia etched or otherwise marked upon the surface of the plate 12. Since the thermometer is inside of the case it will read the temperature of the oil, even though it may not be submerged in the oil. When in operation, the oil will splash upon the plate and heat the thermometer element to the temperature of the oil. It will be noted also that this agitation or splashing of the oil will keep the plate 12 washed on the inside so that it is possible for the operator to see through it.

One of the studs 16 has a marker 42 attached to it. This marker has etched on it the legend "Full." It may be rotated to position which would normally be the full level for the lubricant within the transmission. It is on the outside of the ring 14 and therefore may be bent down along the edges of the ring 14 so that once it is set, it is permanently in this position.

The plate, in addition to being transparent, is made of material which is an electrical insulator. The tube 24 and bolts 20 as well as the stop element 34 are all of electrical conductive material. Connected to the top bolt 20 is an electrical conductor 44 which is insulated and connected to one terminal of light 46 or other indicator. The light is physically located on the dash in view of the operator. The other terminal of the light is connected through battery 48 to ground. The magnet assembly is insulated from the frame of the transmission so that normally there is not a closed circuit through the indicator light 46 and battery 48. However, should iron filings upon the magnet assembly be so great that they bridge the gap between the lower edge of the tube 24 and the proximate housing of the transmission, this will complete the circuit from the frame through the filing and magnet tube, through the light to the battery thereby activating the indicator to give an indication to the operator that something is amiss in the transmission.

There is also a conductive strap 50 which extends from one of the studs 16 to bolt 38. Therefore, the thermometer element itself is grounded. The stop is so positioned that if the temperature in the transmission becomes excessive the indicator of the thermometer will contact the stop. This likewise will complete the circuit from ground, through the thermometer element (which is also an electrical conductive material), through the stop, and tube to the light. This also gives an indication of trouble in the transmission.

The thermometer has an additional feature and advantage to that of indicating the temperature of the oil. The temperature of the transmission oil can be added to the daily check sheet which would include whether or not the transmission oil level is full and whether there is iron filings on the magnet assembly. If the temperature in the transmission were not included on this check sheet, the operator would be tempted to say the oil level was full and there was no presence of iron filings on the magnet assembly. However, if he is required to also give a temperature reading he is more likely to make the actual check. When he checks the temperature it will be in the same location as the magnet assembly and the level indicator. Therefore, the adding of the thermometer insures that the operator will perform the disagreeable task of getting beneath the unit and actually checking the level of lubricant in the transmission as well as checking for presence of iron filings on the magnet assembly.

Three separate magnets are used in the magnet assembly. This makes it possible for the assembly to collect iron filings over its entire length. This is desirable because a certain amount of wear will normally occur in the transmission. Having three magnets and therefore six separate poles is better than a single magnet with two poles because the magnet assembly has a greater area which to collect the filings. It is noted that the magnet has greater capacity to hold filings when mounted on the transparent plate. As the plate is non-magnetic, the magnetic force is not attenuated by the early bridging of filings from the magnet to a magnetic support.

It may be seen that I have provided a simple but effective gauge which is easy and simple to install on existing trucks and which gives information which is customarily not given on existing installations.

It will be apparent that the embodiment shown is only exemplary and that various modifications can be made in construction, materials, and arrangement within the scope of the invention as defined in the appended claims.

I claim as my invention:

1. A transmission lubricant gauge for trucks having a standard power take-off opening in its housing, comprising: a transparent plate, said plate adapted to be attached over the standard power take-off opening in lieu of the regular cover, said plate being an electrical insulator; a thermometer attached to the inside of said plate so that when the gauge is installed the thermometer is in position to measure the temperature of the lubricant, said thermometer being visual to the outside, said thermometer including a spiral element with a pointer at one end of the spiral, a strap of electrical conductive material electrically connecting the thermometer spiral to the housing of the transmission; a tube of electrically conductive, non-magnetic material attached to the inside of said plate, a plurality of magnets within said tube, the lower edge of said tube being proximate the housing of the transmission, a non-magnetic stop element of electrically conductive material attached to said tube, said stop element located in such a position as to contact the pointer of the thermometer when the thermometer registers excessive temperature; an indicator, an electric battery electrically connected to the housing of the transmission; means for electrically connecting said tube, which is otherwise electrically insulated from the housing of the transmission, to said indicator and battery so that the contacting of the pointer to the stop element will activate the indicator and also that upon attraction of metal particles to the magnet the bridging of the gap between the tube and the housing of the transmission will activate the indicator; and a marker on the outside of the plate to indicate the desired level for the lubricant within the transmission housing; thus providing for a visual inspection of the conditions within the transmission housing.

2. A transmission lubricant gauge for transmissions having an electrically conductive housing, said housing having lubricants therein, comprising: a thermometer having a moving element which is an electrical conductor, said moving element electrically connected to said housing, said thermometer being below the level of said lubricant and therein, a magnetic assembly, said magnetic assembly electrically insulated from said housing, a stop element on said magnetic assembly, said stop element being electrically conductive, said stop element being mounted in the path of the movement of said moving element of the thermometer, a portion of said magnetic assembly being proximate the housing of the transmission, an indicator located at a remote point, a battery; and means for electrically connecting the housing of the transmission, the battery, the indicator, and the magnetic assembly in series; so that when the moving element of the thermometer contacts the stop element on the magnetic assembly that the indicator is activated, and further that upon attraction of metal particle to the magnetic assembly the bridging of the space between the magnetic assembly and the housing will activate the indicator.

3. In a truck transmission having a standard power take-off opening in the housing, a lubricant in the housing, the normal level of which is above part of the opening, the improvement comprising: a transparent plate attached over the opening in lieu of the regular cover, a thermometer attached to the inside surface of said plate so that the thermometer is exposed to the transmission lubricant, said thermometer being visible to the outside, and a magnet attached to the inside surface of the plate exposed to the lubricant, said magnet being visible to the outside so that any iron filings in the lubricant are attracted to the magnet and are visible to the outside; so arranged and constructed that when the temperature as indicated by the thermometer is observed, the lubricant level and iron filings on the magnet are observed also.

References Cited in the file of this patent

UNITED STATES PATENTS

| | | |
|---|---|---|
| Re. 20,291 | Bock | Mar. 9, 1937 |
| 1,293,611 | McCarty | Feb. 4, 1919 |
| 1,554,967 | Freeman | Sept. 22, 1925 |
| 1,592,227 | Ryan et al. | July 13, 1926 |
| 1,627,883 | Blair | May 10, 1927 |
| 1,813,122 | Moore | July 7, 1931 |
| 2,235,252 | Bradley | Mar. 18, 1941 |
| 2,450,630 | Bourne | Oct. 5, 1948 |
| 2,462,715 | Booth | Feb. 22, 1949 |
| 2,568,068 | Harpman | Sept. 18, 1951 |
| 2,878,342 | Arthur | Mar. 17, 1959 |